United States Patent [19]

Uri

[11] Patent Number: 4,922,955
[45] Date of Patent: May 8, 1990

[54] FLUID FLOW CONTROL DEVICE
[75] Inventor: Ehud Uri, Menashe, Israel
[73] Assignee: Plasson Maagan Michael Industries Ltd.
[21] Appl. No.: 383,478
[22] Filed: Jul. 24, 1989
[30] Foreign Application Priority Data Dec. 16, 1988 [IL] Israel .......................................... 88703
[51] Int. Cl.⁵ ............................................. F16K 15/14
[52] U.S. Cl. ................................ 137/496; 137/505.25; 137/508; 137/859
[58] Field of Search ................... 137/496, 505.25, 508, 137/859

[56] References Cited
U.S. PATENT DOCUMENTS

| 2,935,083 | 5/1960 | Singer | 137/505.25 |
| 3,196,901 | 7/1965 | Phillips | 137/505.25 X |
| 3,545,485 | 12/1970 | Clark | 137/508 |
| 4,129,143 | 12/1978 | Hoffmann | 137/496 |

Primary Examiner—Robert G. Nilson
Attorney, Agent, or Firm—Benjamin J. Barish

[57] ABSTRACT

A fluid flow control device, comprises a displaceable valve member disposed within a chamber and including an inlet valve element on one side facing an inlet valve opening and movable to open and closed positions with respect thereto, an outlet valve element on the opposite side facing an outlet valve opening and movable to open and closed positions with respect thereto, a substantially rigid connection between the two valve elements, and a passageway extending through the rigid connection and the two valve elements. The outlet valve opening and the outlet valve element are larger than the inlet valve opening and inlet valve element, respectively, such that the fluid flow control device permits fluid flow only in the direction of the inlet to the outlet, and produces a reduction in pressure between the inlet and outlet having a constant ratio depending on the ratio of the areas of the inlet and outlet diaphragms.

20 Claims, 2 Drawing Sheets

FLUID FLOW CONTROL DEVICE

BACKGROUND OF THE INVENTION

The present invention relates to fluid flow control devices. The invention is particularly useful as a valve for controlling the flow of water or other liquid, and is therefore described below with respect to this application.

Whenever it is desired to permit fluid flow only in one direction, a check valve may be used; and whenever it is desired to reduce the pressure between the inlet and outlet, a pressure-reducer or expansion valve may be used. Many different types of check valves and pressure-reducer valves have been developed and are commercially available.

OBJECTS AND SUMMARY OF THE INVENTION

An object of the present invention is to provide a fluid flow control device which acts both as a check valve and as a pressure-reducer valve, and which reduces the pressure at a constant ratio irrespective of the change in pressure at the inlet or outlet of the device. Another object of the invention is to provide a fluid flow control device which is constructed of a few simple parts which can be manufactured and assembled in volume and at low cost.

According to the present invention, there is provided a fluid flow control device comprising a housing having an inlet, an outlet, an inlet valve opening communicating with the inlet, an outlet valve opening communicating with the outlet, and a chamber interconnecting the inlet valve opening and the outlet valve opening. A displaceable valve member is disposed within the chamber and includes an inlet diaphragm on one side facing the inlet valve opening and movable to open and closed positions with respect thereto, an outlet diaphragm on the opposite side facing the outlet valve opening and movable to open and closed positions with respect thereto, a substantially rigid connection between the inlet diaphragm and the outlet diaphragm, and a passageway extending through the rigid connection, inlet diaphragm and outlet diaphragm. The outlet valve opening and the outlet diaphragm are larger than the inlet valve opening and inlet diaphragm, respectively, such that the fluid flow control device permits fluid flow only in the direction of the inlet to the outlet, and produces a reduction in pressure between the inlet and outlet having a constant ratio depending on the ratio of the areas of the inlet and outlet diaphragms.

According to further important features in the preferred embodiment of the invention described below, the inlet diaphgram is fixed at its outer circumference to the housing in the side of the chamber adjacent the inlet valve opening; and the outlet diaphgram is fixed at its outer circumference to the housing in the side of the chamber adjacent the outlet valve opening. More particularly, the inlet diaphragm and the outlet diaphragm are each formed with a circumferential bead fixed to the respective side of the housing. Also, the substantially rigid connection is integrally formed with the inlet diaphragm, the outlet diaphragm and the circumferential beads.

According to further features in the described preferred embodiment, the housing includes an inlet housing section containing the inlet and inlet valve opening, an outlet housing section containing the outlet and the outlet valve opening, and an intermediate housing section connecting together the inlet and outlet housing sections. The circumferential bead of the inlet diaphragm is secured between the inlet and intermediate housing sections; and the circumferential bead of the outlet diaphragm is secured between the outlet and intermediate housing sections. The three housing sections are constructed so that they may be quickly assembled by a snap-action fit.

It will thus be seen that a fluid flow control device, such as for controlling the flow of water, may be constructed in accordance with the foregoing features to act as a pressure-reducer valve, in which the reduction in pressure at the outlet is at a constant ratio with respect to the pressure at the inlet irrespective of changes in pressure either at the inlet or outlet, this constant pressure ratio depending on the ratio of the areas of the inlet and outlet diaphragms. It will also be seen that the fluid flow control device constructed in accordance with the foregoing features acts as a check valve, permitting flow only in a direction from the inlet to the outlet. Further, such a device may be constructed of a few relatively simple parts which may be manufactured and assembled in volume and at low cost.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
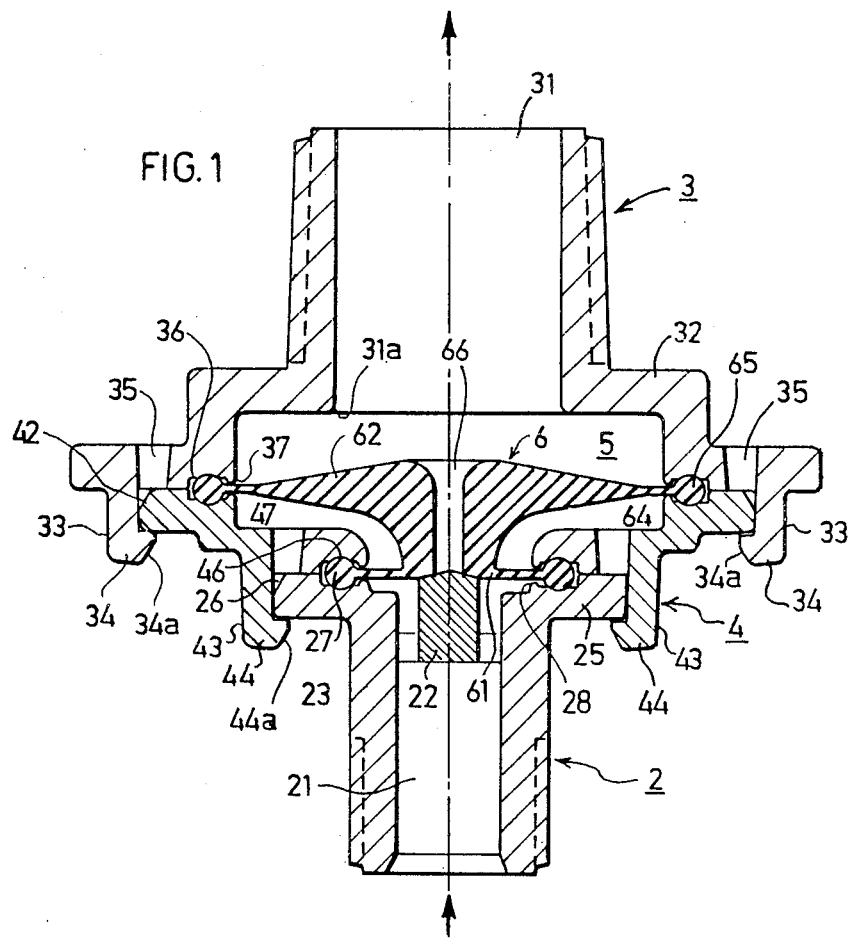
FIG. 1 is a longitudinal sectional view illustrating one form of fluid-control device constructed in accordance with the present invention.

The fluid flow control device illustrated in the drawings is particularly for use as a combined pressure-reducer and check valve for controlling the flow of water or other liquid. It comprises a housing including three sections, namely: an inlet housing section 2, an outlet housing 3, and an intermediate housing section 4 connecting together housing sections 2 and 3 by a snap-action fit, as will be described more particularly below. Housing section 2 is externally threaded for coupling to an inlet pipe, and housing section 3 is also externally threaded for coupling to an outlet pipe.

The three housing sections 2, 3, 4 define an internal chamber 5 in which is disposed a displaceable valve member 6 for controlling the fluid flow. As will be described more particularly below, valve member 6 permits fluid flow only in the direction from the inlet to the outlet; it also produces a reduction in pressure between the inlet and outlet having a constant ratio, irrespective of variations in the inlet or outlet pressure.

Figure 2:
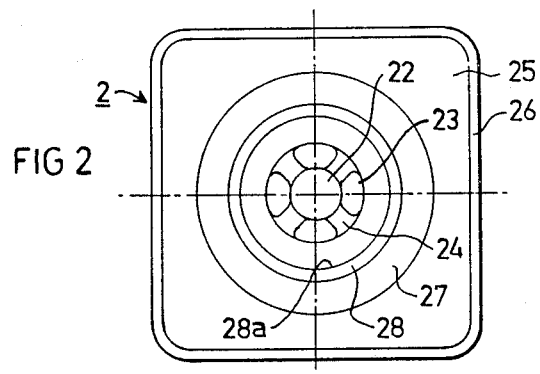
FIG. 2 is a top plan view of the inlet housing section in the device of FIG. 1.

The construction of the housing inlet section 2 is particularly illustrated in FIGS. 1 and 2. It includes a central bore 21 serving as the inlet, and terminating at its inner end in an integrally formed central stem 22 circumscribed by a plurality of openings 23, the stem being integrally connected to the remainder of the inlet housing section 2 by web portion 24 (FIG. 2). The water may thus flow from the inlet 21 through openings 23 into chamber 5.

Inlet housing section 2 is also integrally formed with an outwardly-extending flange 25, of substantially rectangular (preferably square) configuration, which is engageable by the intermediate housing section 4 when the latter is attached to the inlet housing section 2. To permit a snap-action attachment, flange 25 is formed with a tapered edge 26. The upper face of flange 25 is formed with an annular recess 27 bounded on its inner side by an annular rib 28, for purposes to be described below.

Figure 3:
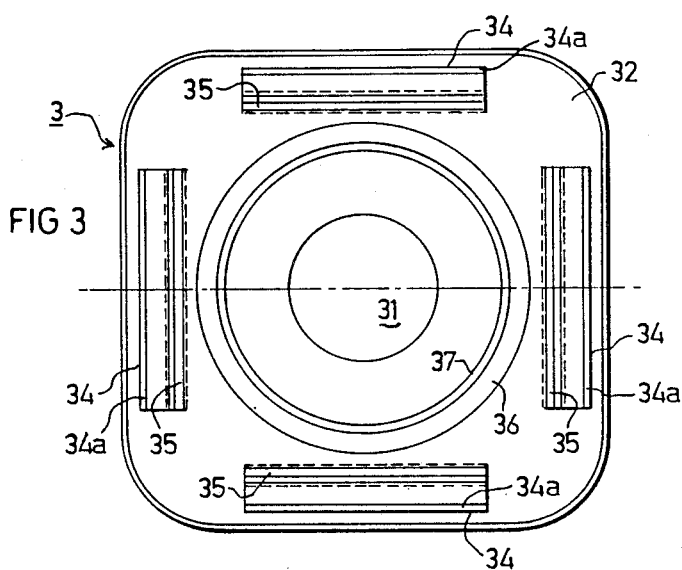
FIG. 3 is a bottom plan view of the outlet housing section in the device of FIG. 1.

The outlet housing section 3, as shown particularly in FIGS. 1 and 3, includes a large central bore 31 serving as the outlet leading to the outlet pipe. The outlet housing section 3 is also integrally formed with a rectangular (square) flange 32 of the same configuration as flange 25 in the inlet housing section 2, except of larger dimensions. Each side of flange 32 includes a depending leg 33 having an inturned foot 34 at its outer tip for attaching the outlet housing section 3 to the intermediate housing section 4. The outer surface of foot 34 is tapered, as shown at 34a, to facilitate this attachment by a snap-action fit. Flange 32 is further formed with an elongated slot 35 inwardly of each leg 33 to increase the flexibility of the leg when used for attaching the two sections together by a snap-action fit.

The outlet housing section 3 is further formed with an annular recess 36 between its central bore 31 and the attaching legs 33, and an annular rib 37 bordering the inner edge of annular recess 36. Annular recess 36 is used for fixing the valve member 6 within chamber 5 when the outer housing section 3 is attached to the intermediate housing section 4.

Figure 4:
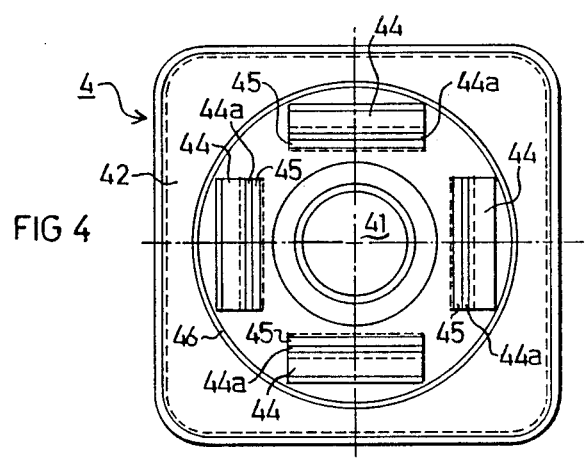
FIG. 4 is a bottom plan view of the intermediate housing section in the device of FIG. 1.

The intermediate housing section 4, as particularly illustrated in FIGS. 1 and 4, is also formed with a central opening 41 surrounded by a rectangular (square) flange 42. The lower face of the intermediate housing section 4 includes four depending legs 43, each terminating in an inturned foot 44 for attachment to the inlet housing section 2. The inner surface of each foot 44 is tapered, as shown at 44a, to permit this attachment to be made by a snap-action fit. Flange 42 is further formed with an elongaged slot 45 inwardly of each leg 43, comparable to slots 35 in the outlet housing section 3, to increase the flexibility of the legs when making the snap-action attachment of the intermediate housing section 4 to the inlet housing section 2.

The lower face of the intermediate housing section 4 is further formed with an annular recess 46 alignable with the annular recess 27 of the inlet housing section 2; and the upper face of the intermediate housing section 4 is formed with another annular recess 47, of larger diameter, equal to the diameter of annular recess 36 formed in the outlet housing section 3.

Valve member 6 is disposed within chamber 5 defined by the three housing sections 2, 3, 4, when assembled together. Valve member 6 is integrally formed with a first diaphragm 61 facing the inlet housing section 2, and with a second diaphragm 62 facing the housing outlet section 3; both diaphragms are interconnected by an integrally formed, substantially rigid stem 63. Inlet diaphragm 61 is secured between housing sections 2 and 4, and for this purpose it is formed with a circumferential bead 64 received within the annular recesses 27 and 46 of these two housing section when they are attached together. Outlet diaphragm 62 is secured between housing sections 3 and 4, and for this purpose it is also formed with a circumferential bead 65 received within the recesses 36 and 47 of these two housing sections when they are attached together. Valve member 6 further includes an axially-extending bore 66 serving as a passageway which passes through the inlet diaphragm 61, the outlet diaphragm 62, and the interconnecting stem 63.

The illustrated device is assembled in the following manner: First, the inlet housing section 2 is aligned with the intermediate housing section 4, and with annular bead 64 of diaphragm 61 received in the annular recesses 27, 46 of the two housing sections. The two housing sections are then pressed together to make a snap-action fit by causing legs 43 of the intermediate housing section 4 to snap over the outer edges of flange 25 of the inlet housing section 2. Annular bead 65 of diaphragm 62 is then inserted within the aligned annular recesses 36 and 47 of the two housing sections 3 and 4, and the legs 33 of the outlet housing section 3 are then snapped around flange 42 of the intermediate housing section 4. These simple assembly steps firmly secure the valve member 6 within chamber 5 formed by these housing sections.

The illustrated device operates as follows:

When the device is first connected to a pressurized source of water, the pressure deflects the inlet diaphragm 61 away from the inlet valve opening, thereby opening the inlet valve. This deflection of the inlet diaphragm 61 is transmitted by stem 63 to the outlet diaphragm 62, which seats against the outlet valve opening 31a. However, the water flows from the inlet 21 to the outlet 31 via bore 66 through valve member 6.

The water flow will continue in this manner until the pressure at the outlet 31 increases to a predetermined value, for example by closing an upstream valve. When the outlet pressure applied to the outlet diaphragm 62, multiplied by the area of diaphragm 62 exceeds the inlet pressure applied to the inlet diaphragm 61, multiplied by the area of diaphragm 61, the outlet pressure will move valve member 6 to cause its inlet diaphragm 61 to seat against stem 22, thereby terminating the flow through the device, i.e., bore 66.

It will thus be seen that the illustrated device acts as a check valve permitting flow only from the inlet to the outlet, and also as a pressure-reducer valve producing a reduction in the pressure from the inlet to the outlet having a constant pressure ratio, namely the ratio of the area of the two diaphragms 61 and 62, irrespective of variations in the inlet and/or outlet pressures. It will also be seen that the illustrated device can be constructed using only four relatively simple parts which can be produced and assembled in volume and at low cost.

While the invention has been described with respect to one preferred embodiment, it will be appreciated that many variations, modifications and other applications of the invention may be made.

What is claimed is:

1. A fluid flow control device, comprising:
    a housing having an inlet, an outlet, an inlet valve opening communicating with said inlet, an outlet valve opening communicating with said outlet, and a chamber interconnecting said inlet valve opening and said outlet valve opening;
    and a displaceable valve member disposed within said chamber and including an inlet diaphragm on one side facing said inlet valve opening and movable to open and closed positions with respect thereto, an outlet diaphragm on the opposite side facing said outlet valve opening and movable to open and closed positions with respect thereto, a substantially rigid connection between said inlet diaphragm and said outlet diaphragm, and a passageway extending through said rigid connection, inlet diaphragm and outlet diaphragm;

the outlet valve opening and the outlet diaphragm being larger than said inlet valve opening and inlet diaphragm, respectively, such that the fluid flow control device permits fluid flow only in the direction of said inlet to said outlet, and produces a reduction in pressure between said inlet and outlet having a constant ratio depending on the ratio of the areas of said inlet and outlet diaphragms.

2. The device according to claim 1, wherein said inlet diaphragm is fixed at its outer circumference to said housing in the side of said chamber adjacent said inlet valve opening; and said outlet diaphragm is fixed at its outer circumference to said housing in the side of said chamber adjacent said outlet valve opening.

3. The device according to claim 2, wherein said inlet diaphragm and said outlet diaphragm are each formed with a circumferential bead fixed to the respective side of said housing.

4. The device according to claim 3, wherein said substantially rigid connection is integrally formed with said inlet diaphragm, said outlet diaphragm, and said circumferential beads.

5. The device according to claim 3, wherein said housing includes: an inlet housing section containing said inlet and inlet valve opening, an outlet housing section containing said outlet and said outlet valve opening, and an intermediate housing section connecting together said inlet and outlet housing sections; said circumferential bead of the inlet diaphragm being secured between said inlet housing section and said intermediate housing section; said circumferential bead of the outlet diaphragm being secured between said outlet housing section and said intermediate housing section.

6. The device according to claim 5, wherein said intermediate housing section is formed on one face with a plurality of legs engageable with said inlet housing section for attaching said two housing sections together.

7. The device according to claim 6, wherein said inlet housing section is formed with an outwardly-extending flange engageable with said legs of the intermediate housing section, the confronting faces of said legs and flange being formed with tapered edges permitting attachment of said two sections together by a snap-action.

8. The device according to claim 7, wherein said intermediate housing section is formed with an opening inwardly of each of said legs to increase the flexibility thereof when applied by a snap-action to the outwardly-extending flange of said inlet housing section.

9. The device according to claim 8, wherein said outwardly-extending flange of said inlet housing section is of generally rectangular configuration, and said intermediate housing section is formed with four of said legs, each engageable with one side of the flange.

10. The device according to claim 9, wherein said outlet housing section is formed on one face with a plurality of legs engageable with said intermediate housing section for attaching said two housing sections together.

11. The device according to claim 10, wherein said intermediate housing section is formed with an outwardly-extending flange engageable with said depending legs of the outlet housing section, the confronting faces of said legs and flange being formed with tapered edges permitting attachment of said two sections together by a snap-action.

12. The device according to claim 11, wherein said outlet housing section is formed with an opening inwardly of each of its legs to increase the flexibility thereof when applied by a snap-action to the outwardly-extending flange of said intermediate housing section.

13. The device according to claim 12, wherein said outwardly-extending flange of said intermediate housing section is of generally rectangular configuration, and said outlet housing section is formed with four legs, each engageable with one side of said flange.

14. The device according to claim 5, wherein said inlet housing section is formed with a central stem engageable with the inlet end of said passageway extending through said substantially rigid connection when the inlet valve element is in its closed position; said inlet housing section further including a plurality of openings around said central stem.

15. A fluid flow control device, comprising:

a housing having an inlet, an outlet, an inlet valve opening communicating with said inlet, an outlet valve opening communicating with said outlet, and a chamber interconnecting said inlet valve opening and said outlet valve opening;

and a displaceable valve member disposed within said chamber and including an inlet diaphragm on one side facing said inlet valve opening and movable to open and closed positions with respect thereto, an outlet diaphragm on the opposite side facing said outlet valve opening and movable to open and closed positions with respect thereto, a substantially rigid connection integrally formed with said two diaphragms, and a passageway extending through said rigid connection and said two diaphragms;

the outlet valve opening and the outlet diaphragm being larger than said inlet valve opening and inlet diaphragm, respectively, such that the fluid flow control device permits fluid flow only in the direction of said inlet to said outlet, and produces a reduction in pressure between said inlet and outlet having a constant ration depending on the ratio of the areas of said inlet and outlet diaphragms.

16. The device according to claim 15, wherein said inlet diaphragm and said outlet diaphragm are each formed with a circumferential bead fixed to the respective side of said housing.

17. The device according to claim 16, wherein said substantially rigid connection is integrally formed with said inlet diaphragm, said outlet diaphragm, and said circumferential beads.

18. The device according to claim 16, wherein said housing includes: an inlet housing section containing said inlet and inlet valve opening, an outlet housing section containing said outlet and said outlet valve opening, and an intermediate housing section connecting together said inlet and outlet housing sections; said circumferential bead of the inlet diaphragm being secured between said inlet housing section and said intermediate housing section; said circumferential bead of the outlet diaphragm being secured between said outlet housing section and said intermediate housing section.

19. The device according to claim 18, wherein said intermediate housing section is formed on one face with a plurality of legs engageable with said inlet housing section for attaching said two housing sections together.

20. The device according to claim 19, wherein said inlet housing section is formed with an outwardly-extending flange engageable with said legs of the intermediate housing section, the confronting faces of said legs and flange being formed with tapered edges permitting attachment of said two sections together by a snap-action.

* * * * *